US012156010B2

(12) United States Patent
Scheek

(10) Patent No.: US 12,156,010 B2
(45) Date of Patent: Nov. 26, 2024

(54) LINEAR MOTOR MAGNET ASSEMBLY AND LOUDSPEAKER UNIT

(71) Applicant: Mayht Holding B.V., Santa Barbara, CA (US)

(72) Inventor: Timothy Ruben Scheek, Rotterdam (NL)

(73) Assignee: Mayht Holding B.V., Nieuw-Vennep (NL)

(*) Notice: Subject to any disclaimer, the term of this patent is extended or adjusted under 35 U.S.C. 154(b) by 0 days.

(21) Appl. No.: 18/490,644

(22) Filed: Oct. 19, 2023

(65) Prior Publication Data

US 2024/0048915 A1 Feb. 8, 2024

Related U.S. Application Data

(63) Continuation of application No. 17/602,314, filed as application No. PCT/EP2019/069355 on Jul. 18, 2019.

(30) Foreign Application Priority Data

Apr. 11, 2019 (EP) .................................... 19168687

(51) Int. Cl.
*H04R 9/06* (2006.01)
*H04R 3/00* (2006.01)
(Continued)

(52) U.S. Cl.
CPC ............. *H04R 9/063* (2013.01); *H04R 3/002* (2013.01); *H04R 7/04* (2013.01); *H04R 7/16* (2013.01);
(Continued)

(58) Field of Classification Search
CPC . H04R 3/002; H04R 7/04; H04R 7/16; H04R 9/025; H04R 9/06; H04R 9/063;
(Continued)

(56) References Cited

U.S. PATENT DOCUMENTS 4,607,382 A * 8/1986 Dijkstra .................... H04R 9/06 381/59
5,440,644 A 8/1995 Farinelli et al.
(Continued)

FOREIGN PATENT DOCUMENTS

EP 1049353 A2 11/2000
EP 1389853 A1 2/2004
(Continued)

OTHER PUBLICATIONS

AudioTron Quick Start Guide, Version 1.0, Mar. 2001, 24 pages.
(Continued)

*Primary Examiner* — Huyen D Le
(74) *Attorney, Agent, or Firm* — Fortem IP LLP

(57) ABSTRACT

A linear motor magnet assembly for use in a loudspeaker unit, with a fixed base actuator component and a membrane actuating element, the membrane actuating element having a linear excursion axis. A first auxiliary magnetic element and a second auxiliary magnetic element are present, the first auxiliary magnetic element providing a first auxiliary spatial magnetic field with a major axis aligned with the linear excursion axis. The second auxiliary magnetic element is fixedly connected to the membrane actuating element of the linear motor magnet assembly and has a second auxiliary spatial magnetic field, the second auxiliary magnetic field overlapping the first auxiliary spatial magnetic field and being substantially similarly oriented as the first auxiliary spatial magnetic field over a first predetermined excursion range of the linear motor magnet assembly.

16 Claims, 2 Drawing Sheets

(51) Int. Cl.
*H04R 7/04* (2006.01)
*H04R 7/16* (2006.01)
*H04R 9/02* (2006.01)

(52) U.S. Cl.
CPC ............... *H04R 9/025* (2013.01); *H04R 9/06* (2013.01); *H04R 2209/026* (2013.01); *H04R 2209/041* (2013.01)

(58) Field of Classification Search
CPC .............. H04R 11/02; H04R 2209/026; H04R 2209/041
See application file for complete search history.

(56) References Cited

U.S. PATENT DOCUMENTS

| | | | | |
|---|---|---|---|---|
| 5,761,320 | A | 6/1998 | Farinelli et al. | |
| 5,828,767 | A | 10/1998 | Button | |
| 5,923,902 | A | 7/1999 | Inagaki | |
| 6,032,202 | A | 2/2000 | Lea et al. | |
| 6,256,554 | B1 | 7/2001 | DiLorenzo | |
| 6,404,811 | B1 | 6/2002 | Cvetko et al. | |
| 6,469,633 | B1 | 10/2002 | Wachter | |
| 6,522,886 | B1 | 2/2003 | Youngs et al. | |
| 6,574,346 | B1 | 6/2003 | Tanaka | |
| 6,611,537 | B1 | 8/2003 | Edens et al. | |
| 6,631,410 | B1 | 10/2003 | Kowalski et al. | |
| 6,757,517 | B2 | 6/2004 | Chang | |
| 6,778,869 | B2 | 8/2004 | Champion | |
| 7,130,608 | B2 | 10/2006 | Hollstrom et al. | |
| 7,130,616 | B2 | 10/2006 | Janik | |
| 7,143,939 | B2 | 12/2006 | Henzerling | |
| 7,236,773 | B2 | 6/2007 | Thomas | |
| 7,295,548 | B2 | 11/2007 | Blank et al. | |
| 7,391,791 | B2 | 6/2008 | Balassanian et al. | |
| 7,483,538 | B2 | 1/2009 | McCarty et al. | |
| 7,571,014 | B1 | 8/2009 | Lambourne et al. | |
| 7,630,501 | B2 | 12/2009 | Blank et al. | |
| 7,643,894 | B2 | 1/2010 | Braithwaite et al. | |
| 7,657,910 | B1 | 2/2010 | McAulay et al. | |
| 7,853,341 | B2 | 12/2010 | McCarty et al. | |
| 7,987,294 | B2 | 7/2011 | Bryce et al. | |
| 8,014,423 | B2 | 9/2011 | Thaler et al. | |
| 8,045,952 | B2 | 10/2011 | Qureshey et al. | |
| 8,103,009 | B2 | 1/2012 | Mccarty et al. | |
| 8,234,395 | B2 | 7/2012 | Millington | |
| 8,483,853 | B1 | 7/2013 | Lambourne | |
| 8,942,252 | B2 | 1/2015 | Balassanian et al. | |
| 2001/0042107 | A1 | 11/2001 | Palm | |
| 2002/0022453 | A1 | 2/2002 | Balog et al. | |
| 2002/0026442 | A1 | 2/2002 | Lipscomb et al. | |
| 2002/0124097 | A1 | 9/2002 | Isely et al. | |
| 2003/0123695 | A1 | 7/2003 | Brandt | |
| 2003/0157951 | A1 | 8/2003 | Hasty, Jr. | |
| 2004/0024478 | A1 | 2/2004 | Hans et al. | |
| 2006/0222200 | A1* | 10/2006 | Nagaoka | H04R 9/06 381/412 |
| 2007/0142944 | A1 | 6/2007 | Goldberg et al. | |
| 2020/0037078 | A1* | 1/2020 | Scheek | H04R 9/025 |
| 2023/0097602 | A1* | 3/2023 | Pfeffer | H04R 9/025 381/412 |

FOREIGN PATENT DOCUMENTS

| | | | |
|---|---|---|---|
| JP | H0654397 | U | 7/1994 |
| JP | 2000308174 | A | 11/2000 |
| JP | 2009033382 | A | 2/2009 |
| WO | 200153994 | | 7/2001 |
| WO | 2003093950 | A2 | 11/2003 |
| WO | 2018056814 | A1 | 3/2018 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
International Searching Authority, International Search Report and Written Opinion mailed on Dec. 4, 2019, issued in connection with International Application No. PCT/EP2019/069355, filed on Jul. 18, 2019, 9 pages.
Japanese Patent Office, Office Action and Translation mailed on Sep. 5, 2023, issued in connection with Japanese Application No. 2021-559885, 6 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action mailed on Jul. 20, 2023, issued in connection with U.S. Appl. No. 17/602,314, filed Oct. 8, 2021, 13 pages.
Non-Final Office Action mailed on Dec. 7, 2023, issued in connection with U.S. Appl. No. 18/490,631, filed Oct. 19, 2023, 12 pages.
Notice of Allowance mailed on Dec. 15, 2023, issued in connection with U.S. Appl. No. 17/602,314, filed Oct. 8, 2021, 8 pages.
Palm, Inc., "Handbook for the Palm VII Handheld," May 2000, 311 pages.
Presentations at WinHEC 2000, May 2000, 138 pages.
*Sonos, Inc.* v. *DM Holdings* (No. 14-1330-RGA), DI 219, Claim Construction Opinion (Jan. 12, 2017) (24 pages).
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

LINEAR MOTOR MAGNET ASSEMBLY AND LOUDSPEAKER UNIT

CROSS-REFERENCE TO RELATED APPLICATIONS

The present application is a continuation of U.S. patent application Ser. No. 17/602,314, filed Oct. 8, 2021, now U.S. Pat. No. 11,962,988, which is a 371 National Phase application of International Application No. PCT/EP2019/069355, filed Jul. 18, 2019, which claims priority to European Patent Application No. 19168687.2, filed Apr. 11, 2019, each of which is incorporated herein by reference in its entirety.

TECHNICAL FIELD

The present invention relates to a linear motor magnet assembly for use in a loudspeaker unit, the linear motor magnet assembly comprising a fixed base actuator component and a membrane actuating element, the membrane actuating element having a linear excursion axis.

BACKGROUND

Such a linear motor magnet assembly is e.g. known from International patent publication WO2018/056814 which discloses a loudspeaker unit having a membrane and a plurality of drive units driving the membrane.

SUMMARY

The present invention seeks to provide a linear motor magnet assembly for use in a loudspeaker unit that allows to improve the performance of a linear motor actuator system.

According to the present invention, a linear motor magnet assembly as defined above is provided, having a fixed base actuator component and a membrane actuating element, the membrane actuating element having a linear excursion axis. A first auxiliary magnetic element and a second auxiliary magnetic element are present, the first auxiliary magnetic element providing a first auxiliary spatial magnetic field with a major axis aligned with the linear excursion axis of the linear motor magnet assembly. The second auxiliary magnetic element is fixedly connected to the membrane actuating element of the linear motor magnet assembly and has a second auxiliary spatial magnetic field, the second auxiliary spatial magnetic field overlapping the first auxiliary spatial magnetic field and being substantially similarly oriented as the first auxiliary spatial magnetic field over a first predetermined excursion range of the linear motor magnet assembly.

The first auxiliary magnetic element and the second auxiliary magnetic element are positioned in such a way that when the linear motor magnet assembly moves, the combined forces generated by the first auxiliary magnetic element and the second auxiliary magnetic element amplify the motor movement. Thus, the present invention provides an energy efficient and improved linear movement system, by decreasing the stiffness over the excursion of the linear motor. This effectively decreases the power needed by the linear motor system to make the complete excursion. Further embodiments are described by the dependent claims, and with reference to the exemplary embodiments as shown in the drawings.

BRIEF DESCRIPTION OF THE DRAWINGS

The present invention will be discussed in more detail below, with reference to the attached drawings, in which.

DETAILED DESCRIPTION

The present invention relates to a linear motor magnet assembly (also indicated by the terms actuator amplification device or permanent magnet assistant herein), comprising a combination of permanent magnets that use their magnetic field to assist and amplify the motion generated by the linear motor actuator, and application of features that counter non-linearities in the stiffness of an entire loudspeaker device by using the combination of a linear motor and the permanent magnet assistant device.

It is noted that the present invention can be applied in various types of loudspeaker units 1, such as the examples described and disclosed in the patent publication WO2018/056814, and the non-prepublished applications from the same applicant, PCT/NL2018/050263, PCT/EP2018/079509, PCT/EP2019/055831, and EP19162460.0. The linear motor magnet assembly 2 can be implemented according to any of the exemplary embodiments described herein.

Electrodynamic transducers in general have a linear motor, a membrane, and the suspension of the linear motor. Transducers for mid and low frequency responses are usually mounted in an enclosure. Mounting the transducer in an enclosure (which for example can be sealed or ported) increases the total stiffness of the suspension which needs to be overcome by the linear motor. An electrodynamic transducer system able to provide low frequency responses (10 Hz-200 Hz) in a sealed or ported enclosure will usually have stiffness arising from the transducer's own suspension as well as from the air compression inside the enclosure. The air compression induced stiffness increases when the membrane needs to compress air: the higher the needed compression, the higher the stiffness. The transducer's own suspension stiffness will need to be increased as well when the air induced stiffness increases, to prevent unwanted deformation of the suspension caused by the air induced stiffness. In result, the linear motor actuator will need increased power input to create the desired air compression. Ideally, to create an electrodynamic transducer with the lowest distortion caused by non-linearities in stiffness when placed in a sealed or ported enclosure, one would try to achieve the lowest possible stiffness increase caused or required by effects arising from the enclosure. The transducer would ideally behave like it is in free air.

The present invention provides in various embodiments a device using a combination of at least two permanent magnets to improve the performance of a linear motor actuator system by decreasing the stiffness over the complete excursion range of the linear motor, effectively decreasing the power needed by the linear motor system to travel over the excursion range.

Figure 1A:
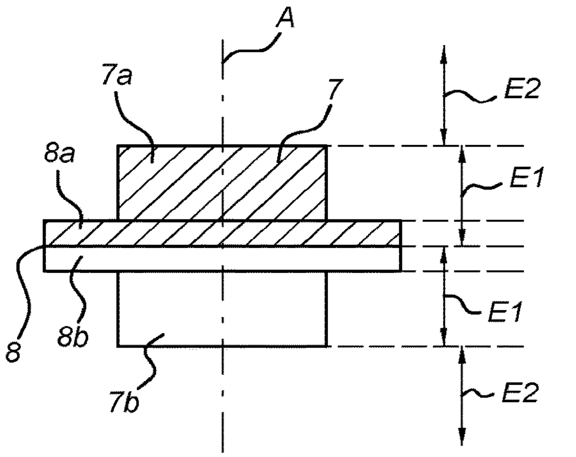
FIGS. 1A and B show an example of a permanent magnet assistant structure in two operational situations according to a first embodiment of the present invention linear magnet motor assembly.
Figure 1B:
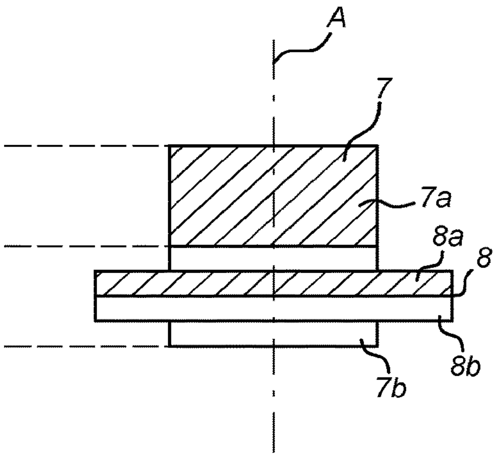

FIG. 1A and FIG. 1B show an example of a part of a linear motor magnet assembly 2 or a permanent magnet assistant structure in two operational situations. This exemplary embodiment comprises axially magnetized magnets, wherein a second auxiliary magnetic element 8 is a ring shaped magnet that moves around a first auxiliary magnetic element 7, which is a cylinder shaped magnet.

The present invention provides an improved linear motor magnet assembly for use in a loudspeaker unit that requires less power needed by the linear motor system to make an excursion of the linear motor. The present invention thus provides a power efficient system that is cost effective and further requires less structural modifications of the system.

Figure 2A:
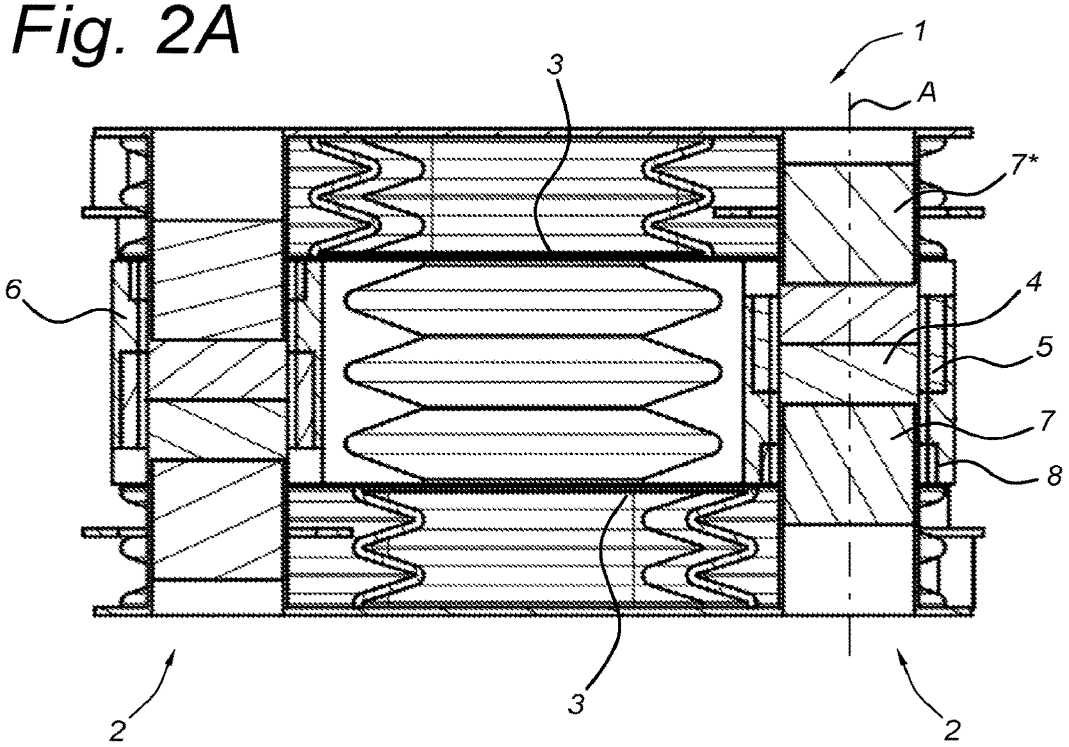
FIG. 2A shows a cross sectional view and FIG. 2B shows a perspective view of a loudspeaker unit having two opposing membranes, each being driven by two linear motor magnet assemblies according to a further embodiment.
Figure 2B:
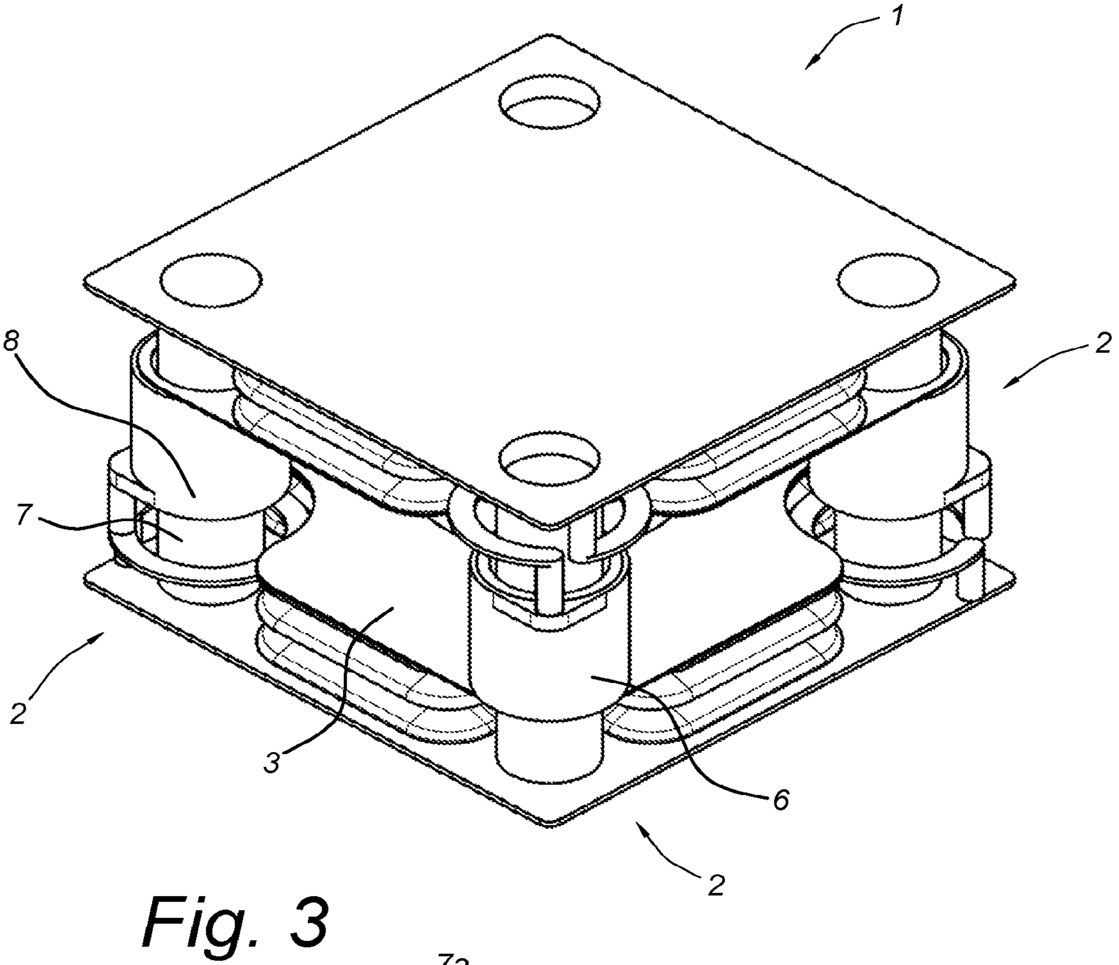

FIG. 2A shows a cross sectional view and FIG. 2B shows a perspective view of an exemplary embodiment of the present invention loudspeaker unit 1 having two opposing membranes 3, each being driven by two linear motor magnet assemblies 2, wherein the present invention embodiments have been implemented.

The linear motor magnet assembly 2 is e.g. applied for use in a loudspeaker unit 1. The linear motor magnet assembly 2 comprises a fixed base actuator component 4 and a membrane actuating element 5. The fixed base actuator component 4 is mechanically connecting two axially aligned magnetic elements 7 and 7*  which are part of the linear motor magnet assembly 2. The material of the fixed base actuator component 4 is of a non-magnetic material, ensuring a proper magnetic field distribution for cooperation between the two axially aligned magnetic elements 7, 7* and a membrane actuating element 5. The membrane actuating element 5 is moveable and has a linear excursion axis A, i.e. the direction in which the membrane 3 moves up and down. Upon actuation, the membrane actuating element 5 moves the linear motor magnetic assembly 2 that is connected to the membrane 3. Thus, the membrane 3 moves up or down depending on the direction of actuation. The two opposing membranes 3 are separated by a predetermined distance. The linear motor magnet assembly 2 further comprises a first auxiliary magnetic element 7 (one of the two axially aligned magnetic elements 7, 7*) and a second auxiliary magnetic element 8. The first auxiliary magnetic element 7 provides a first auxiliary spatial magnetic field with a major axis aligned with the linear excursion axis A of the linear motor magnet assembly 2. The second auxiliary magnetic element 8 is fixedly connected to the membrane actuating element 5 of the linear motor magnet assembly 2 and has a second auxiliary spatial magnetic field. The second auxiliary magnetic field overlaps the first auxiliary spatial magnetic field and is substantially similarly oriented as the first auxiliary spatial magnetic field over a first predetermined excursion range E1 of the linear motor magnet assembly 2.

The present invention embodiments of the loudspeaker unit 1 have two opposing membranes 3 that are placed on the upper and the lower surfaces of the loudspeaker unit 1. The loudspeaker unit 1 is shown as a rectangular unit in FIGS. 2A and 2B, but this is not a limiting geometry. The base element of each of the membranes 3 is structurally connected to two linear motor magnetic assemblies 2 at two of the diagonal ends of the membrane 3. As shown in FIG. 2B; the base element of the lower membrane 3 is structurally connected by two different linear motor magnetic assemblies 2 that are positioned on both of the membrane's lower diagonal ends. Similarly, the base element of the upper membrane 3 is structurally connected by two different linear motor magnetic assemblies 2 that are positioned on both of the membrane's upper diagonal ends. The effect of this combination of features is an increasing magnetic force (or a reduced stiffness) in the excursion direction in the first predetermined excursion range, i.e. the first and second auxiliary magnetic element are aiding in overcoming the suspension force and air compression forces in the loudspeaker unit 1. It is noted that the second auxiliary magnetic element 8 is attached to the membrane actuating element 5, e.g. using a holder body as shown in the cross sectional view of FIG. 2A. It is noted that the fixed connection does not necessarily imply a direct physical attachment to each other of these two elements.

In a further embodiment, the second auxiliary magnetic element 8 is positioned at a first distance along the linear excursion axis A from the membrane actuating element 5. FIG. 1A shows an operational situation in which the second auxiliary magnetic element 8 is positioned at the centre of the first auxiliary magnetic element 7 along the linear excursion axis A. Further, FIG. 1B shows an operational situation in which the second auxiliary magnetic element 8 is positioned away from the centre of the first auxiliary magnetic element 7 along the linear excursion axis A.

A further embodiment of the present invention relates to a linear motor magnet assembly 2, wherein the second auxiliary spatial magnetic field and the first auxiliary spatial magnetic field are only partially overlapping over a second predetermined excursion range E2 of the linear motor magnet assembly 2. This feature will result in a decreasing force in the excursion direction in the second predetermined excursion range E2. In the exemplary embodiment of FIGS. 1A and 1B, the first auxiliary magnetic element 7 has a finite dimension along the axis A, and the second predetermined excursion range E2 than extends beyond the first predetermined excursion range E1.

According to an even further embodiment of the present invention a linear motor magnet assembly 2 is provided, wherein the first auxiliary magnetic element 7 is fixedly connected to the fixed base actuator component 4 of the linear motor magnet assembly 2. The fixed connection does not necessarily imply a direct attachment or a structural connection to each other of these two elements. It can be e.g. a simple magnetic connection or a magnetic connection by levitation.

An even further embodiment of the present invention relates to a linear motor magnet assembly 2, comprising a suspension assembly 6 connected to the membrane actuating element 5 and the fixed base actuator component 4, the suspension assembly 6 being arranged to allow mutual movement between the membrane actuating element 5 and the fixed base actuator component 4 along the linear excursion axis A, and to define a resting position of the membrane actuating element 5 (and the second auxiliary magnetic element 8 fixedly connected thereto) along the linear excursion axis A.

The present invention seeks to further provide in various embodiments a linear motor magnet assembly for use in a loudspeaker unit using a combination of at least two permanent magnets to improve the performance of a linear motor actuator system by decreasing the stiffness over the complete excursion of the linear motor, effectively decreasing the power needed by the linear motor system to make the complete excursion. The present invention embodiments also relate to a linear motor actuator amplification device (or a permanent magnet assistant), comprising a combination of permanent magnets that use their magnetic field to assist and amplify the motion generated by the linear motor actuator, and application of features that counter non-linearities in the stiffness of a complete system by using the combination of a linear motor and the permanent magnet assistant device.

According to an embodiment, the present invention relates to a linear motor magnet assembly 2, wherein the second auxiliary magnetic element 8 comprises a permanent magnetic material. Another embodiment of the present invention relates to a linear motor magnet assembly 2, wherein the second auxiliary magnetic element 8 comprises an electromagnet. In such a system, the second auxiliary magnetic element 8 is magnetised e.g. electrically for a specific period of time. In a similar manner, a further embodiment of the present invention relates to a linear motor magnet assembly 2, wherein the first auxiliary magnetic element 7 comprises a permanent magnetic material. An even further embodiment of the present invention relates to a linear motor magnet assembly 2, wherein the first auxiliary magnetic element 7 comprises an electromagnet.

According to a further exemplary embodiment of the present invention, a linear motor magnet assembly 2 or a motor assistant device is provided, wherein the assistant unit comprises at least two permanent magnets 7, 8. One magnet is attached to the moving part of a linear motor actuator system. The other of the at least two magnets 7, 8 is attached to the static part of the same aforementioned linear motor actuator system. The magnets 7, 8 are positioned in such a way that when the linear motor actuator moves, the forces generated by the assistants magnetic field of the combined moving and static magnets 7, 8 amplifies the motor movement. The architecture of the permanent magnet assistant determines the total force and variation in the counterforce over the excursion of the permanent magnet system that counters the stiffness of the linear motor system. The present invention structure and mutual element orientation allow to provide a more energy efficient linear movement system.

An exemplary embodiment relates to a permanent magnet structure that can be used in combination with a linear motor actuator system, where the permanent magnet structure comprises at least two permanent magnets where one of the at least two permanent magnets is attached to the moving part of the linear motor actuator system, and at least one permanent magnet is attached to the static part of the linear motor actuator system, the permanent magnets being placed in a way that the combined magnetic fields of the permanent magnets of the permanent magnet system counter the increasing stiffness over the excursion of the linear motor actuator system.

In a further embodiment, the permanent magnet structure and linear motor actuator system are provided in combination with a suspension that returns the moving part of the linear motor actuator to a static resting position; where the suspension is caused by mechanical stiffness of a suspension device or stiffness caused by air or fluid pressure.

The present invention also relates to a permanent magnet structure and linear motor actuator system applied in a loudspeaker unit, where a permanent magnet is on the membrane of the loudspeaker unit, and static magnets are placed above and beneath the membrane.

A further embodiment of the present invention relates to a linear motor magnet assembly 2, wherein the first auxiliary magnetic element 7 is formed integrally with the fixed base actuator component 4. This has the benefit that the linear motor magnet assembly has one less structural element (shared components), resulting in less costs and easier manufacturing. The first auxiliary magnetic element 7 comprises either a permanent magnetic material or an electromagnet material.

An exemplary embodiment of the present invention relates to a linear motor magnet assembly 2, wherein the first auxiliary magnetic element 7 is a cylinder (or rod) shaped, axially magnetized permanent magnet (with opposing magnetic poles 7*a*, 7*b* being present at its outer ends, as shown in the exemplary embodiments shown in FIGS. 1A and 1B). A further embodiment of the present invention relates to a linear motor magnet assembly 2, wherein the second auxiliary magnetic element 8 is ring shaped with axially aligned magnetic poles 8*a*, 8*b*, with a central aperture larger than a largest cross sectional diameter of the first auxiliary magnetic element 7. With this geometry it is possible to arrange the first auxiliary magnetic element 7 within the second auxiliary magnetic element 8, at different operational positions.

A further embodiment of the present invention relates to a linear motor magnet assembly 2, wherein the first auxiliary magnetic element 7 has a predetermined shape, providing a predetermined first auxiliary spatial magnetic field profile over the excursion range of the linear motor magnet assembly 2. An even further embodiment of the present invention relates to a linear motor magnet assembly 2, wherein the predetermined shape is a double (e.g. truncated) cone shape with a largest diameter at a middle part of the first auxiliary magnetic element 7. This can be implemented by having one of the magnets as a cone shaped magnet, wherein that shape creates a magnetic field of varying strength over the excursion. This allows to more efficiently control the relative movement of the second auxiliary magnetic element 8 with respect to the first auxiliary magnetic element 7 considering the varying strength of the magnetic field.

Figure 3:
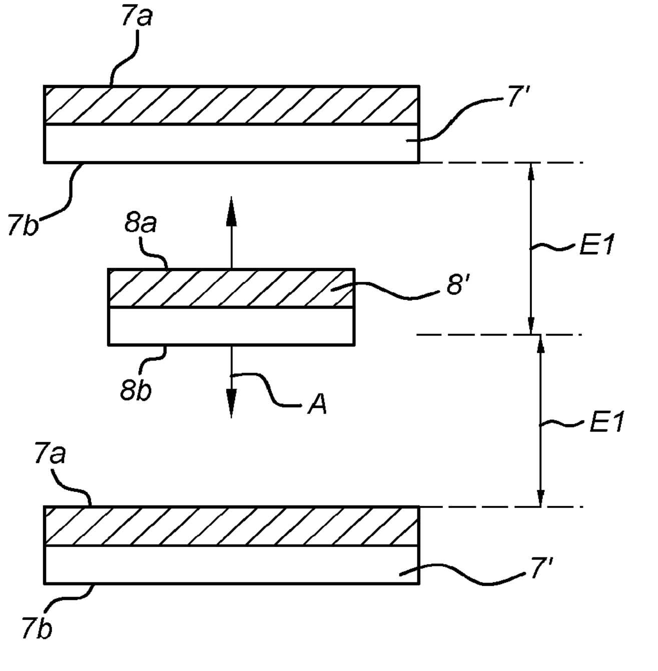
FIG. 3 shows a cross sectional view of a linear motor magnet assembly in accordance with a further embodiment of the present invention.

FIG. 3 shows a cross sectional view of a linear motor magnet assembly in accordance with a further embodiment of the present invention, comprising two magnetic bodies 7' opposed to each other forming the first auxiliary magnetic element, with a magnetic body 8' forming the second auxiliary magnetic element positioned in between. The two magnetic bodies can be of similar type of magnetisation; e.g. both can be permanent magnets or both can be electromagnets. Alternatively, the two magnetic bodies 7' can be magnetised in different manner, e.g. one of them can be a permanent magnet and the other one can be an electromagnet.

The dimensions and shape of the first auxiliary magnetic element and the second auxiliary magnetic element can be different. For example, the first auxiliary magnetic element can be of flat or disc shaped. The second auxiliary magnetic element can be disc or ring shaped. Further, the size of the first auxiliary magnetic element and the second auxiliary magnetic element can be different. As described above, a further embodiment of the present invention relates to a linear motor magnet assembly 2, wherein the first auxiliary magnetic element 7 comprises two (e.g. permanent) magnetic bodies 7) (e.g. flat or disc shaped) at a predetermined distance from each other along the linear excursion axis A, and the second auxiliary magnetic element 8 comprises an axially magnetized magnetic body 8' (e.g. disc or ring shaped) positioned in between the two magnetic bodies 7'. Due to the presence of two magnetic bodies 7', the second auxiliary spatial magnetic field and the first auxiliary spatial magnetic field are partially overlapping over a second predetermined excursion range E2 of the linear motor magnet assembly 2 in symmetric directions. This feature will result in additionally decreasing force in the excursion direction in the second predetermined excursion range E2.

A further embodiment of the present invention relates to a linear motor magnet assembly 2, further comprising two axially aligned magnetic elements 7, 7* having a main spatial magnetic field with a major axis aligned with the linear excursion axis A of the linear motor magnet assembly 2, and the membrane actuating element 5 comprises a voice coil, the voice coil being arranged to generate a coil magnetic field interacting with the main spatial magnetic field to move the voice coil along the linear excursion axis A (i.e. for driving the membrane 3).

Another embodiment of the present invention relates to a loudspeaker unit 1 comprising a membrane 3, and a linear motor magnet assembly 2, wherein the membrane actuating element 5 and the second auxiliary magnetic element 8 are fixedly connected to the membrane 3.

The present invention has been described above with reference to a number of exemplary embodiments as shown in the drawings. Modifications and alternative implementations of some parts or elements are possible, and are included in the scope of protection as defined in the appended claims.

The invention claimed is:

1. A loudspeaker unit comprising:

a membrane coupled to a sealed enclosure; and a linear motor assembly configured to move the membrane along an excursion axis relative to the enclosure, the linear motor assembly comprising:

a membrane actuating element;

a stationary first auxiliary magnetic element comprising first and second magnetic bodies spaced apart from one another and configured to provide a first auxiliary spatial magnetic field with a major axis aligned with the excursion axis; and a movable second auxiliary magnetic element, coupled to the membrane actuating element, the moveable second auxiliary magnetic element configured to provide a second auxiliary spatial magnetic field overlapping the first auxiliary spatial magnetic field and being substantially similarly oriented as the first auxiliary spatial magnetic field over an excursion range of the linear motor assembly, wherein the membrane actuating element comprises a voice coil disposed between the two magnetic bodies of the first auxiliary magnetic element at a resting position, and wherein the linear motor assembly provides a magnetic force that reduces a stiffness of the loudspeaker unit in moving the membrane along the excursion axis.

2. The loudspeaker unit of claim 1, wherein at least one of the first magnetic body or the second magnetic body of the stationary first auxiliary magnetic element is ring-shaped.

3. The loudspeaker unit of claim 1, wherein the movable second auxiliary magnetic element is ring-shaped.

4. The loudspeaker unit of claim 1, wherein the stationary first auxiliary magnetic element comprises a permanent magnet.

5. The loudspeaker unit of claim 1, wherein the stationary first auxiliary magnetic element comprises an electromagnet.

6. The loudspeaker unit of claim 1, wherein the movable second auxiliary magnetic element comprises a permanent magnet.

7. The loudspeaker unit of claim 1, further comprising a second membrane coupled to the sealed enclosure such that the first membrane and the second membrane are disposed on opposing sides of the enclosure.

8. The loudspeaker unit of claim 7, wherein the linear motor assembly configured to simultaneously move both the first membrane and the second membrane inwardly and outwardly along the excursion axis relative to the enclosure.

9. A loudspeaker unit comprising:

a membrane coupled to a sealed enclosure;

a membrane actuating element configured to move the membrane along an excursion axis; and a magnet assembly comprising:

a stationary first magnet;

a stationary second het spaced apart from the stationary first magnet; and a movable third magnet coupled to the membrane and to the membrane actuating element, wherein the magnet assembly provides a magnetic force that reduces a stiffness of the loudspeaker unit in moving the membrane along the excursion axis, and wherein the membrane actuating element comprises a voice coil disposed between the stationary first magnet and the stationary second magnet while at a resting position.

10. The loudspeaker unit of claim 9, wherein the stationary first magnet is ring-shaped.

11. The loudspeaker unit of claim 9, wherein the movable third magnet is ring-shaped.

12. The loudspeaker unit of claim 9, wherein the stationary first magnet comprises a permanent magnet.

13. The loudspeaker unit of claim 9, wherein the stationary first magnet comprises an electromagnet.

14. The loudspeaker unit of claim 9, wherein the movable third magnet comprises a permanent magnet.

15. The loudspeaker unit of claim 9, further comprising a second membrane coupled to the sealed enclosure such that the first membrane and the second membrane are disposed on opposing sides of the enclosure.

16. The loudspeaker unit of claim 15, wherein the loudspeaker unit is configured to simultaneously move both the first membrane and the second membrane inwardly and outwardly along the excursion axis relative to the enclosure.

* * * * *